Oct. 25, 1955  R. B. LOSTUTTER, JR  2,721,722
PLUG VALVE
Filed Aug. 11, 1951
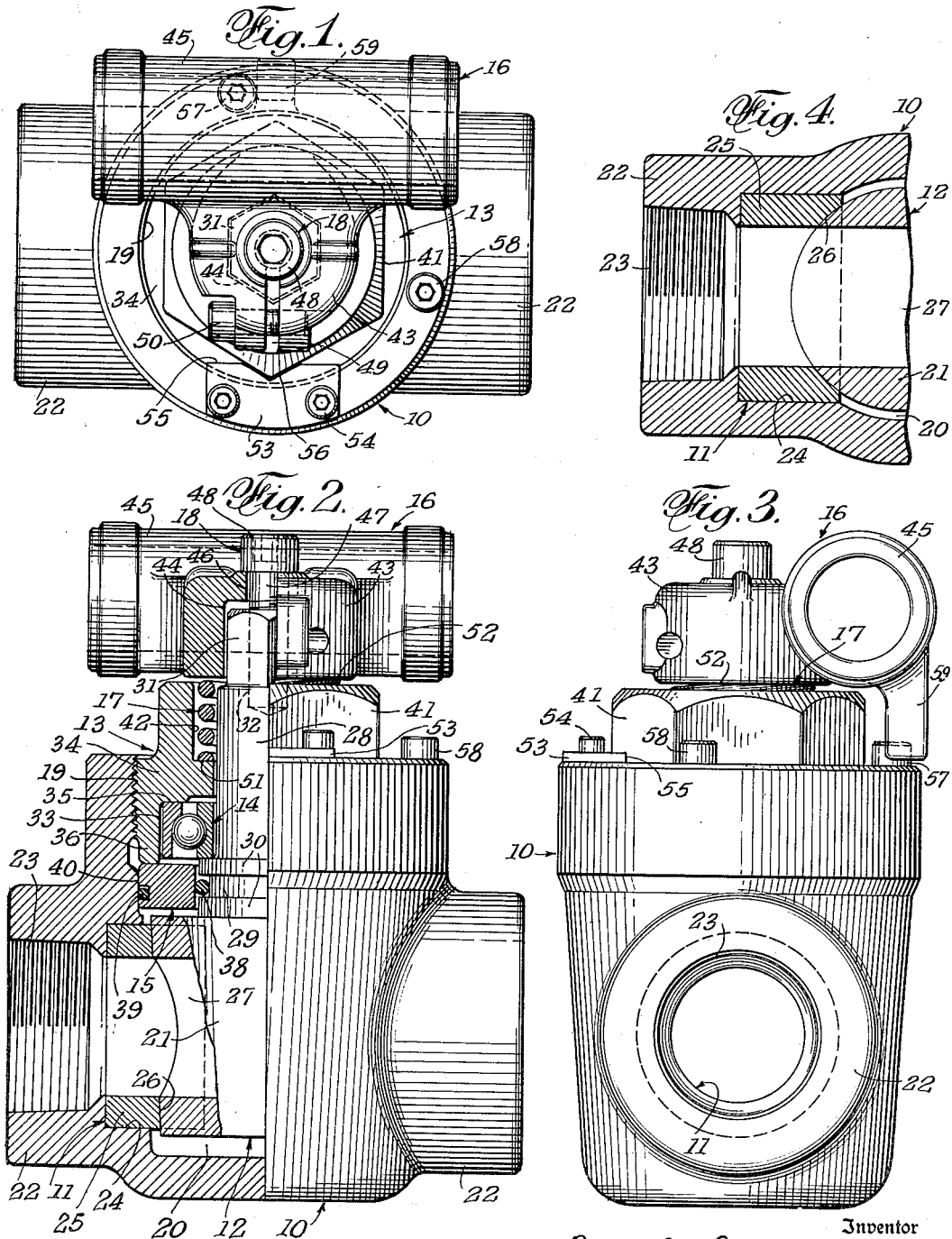
Inventor
Roy B. Lostutter, Jr.
By C. F. Stratton
Attorney

United States Patent Office 2,721,722
Patented Oct. 25, 1955

2,721,722

PLUG VALVE

Roy B. Lostutter, Jr., Burbank, Calif., assignor to Ernest C. Saftig, Newport Beach, Calif.

Application August 11, 1951, Serial No. 241,437

2 Claims. (Cl. 251—192)

This invention relates to a plug valve structure.

Plug or taper cock valves that handle hot fluids are, of course, subject to expansion as are valves that handle fluids under pressure. Such expansion usually takes place in the body of the valve and it has been found that the maximum expansion in the body is transverse to the flow causing distortion that results in the opposed ports being drawn inwardly toward each other. This is particularly so when the body integrally includes the ports that are controlled by the plug.

Accordingly, an object of the present invention is to provide a valve wherein the above-mentioned distortion of the body will not be transmitted to the valve ports which, although fastened to the body, will not distort therewith. By providing the ports as separate elements, the same may be advantageously made of corrosion-resistant metal alloy, while the body may be inexpensively formed of a more corrosive metal.

While the mentioned expansion and distortion of the body will not distort the valve ports, the latter, however, will have limited movement toward and from each other as the valve expands and contracts in use. In present taper plug valves, the plug is frequently seized because the same may move in the direction of its smaller tapered end while the ports are expanded.

Another object of the invention, therefore, is to provide resilient means that uniformly tensions or thrusts the plug in the direction of its larger tapered end and to employ a combination radial-thrust bearing that is pre-loaded by such thrust to hold the tapered plug against endwise movement that may result in seizing or freezing thereof.

A further object of the invention is to provide a plug-mounting assembly that can be removed from and inserted into the valve body as a unit to, thereby, leave undisturbed the spring tension on the plug and the loading on the bearing.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a top plan view of a plug valve according to the present invention.

Fig. 2 is a front view in quarter section.

Fig. 3 is an end view.

Fig. 4 is a plan sectional view of one side of the valve body.

The plug valve that is illustrated comprises, generally, a body 10 having opposed port members 11 therein, a tapered plug 12 for controlling flow between the port members, means 13 mounting the plug in the body 10 and including a radial-thrust bearing 14, a packing ring 15 to seal between means 13 and plug 12, a wrench 16 for rotating the plug, resilient means 17 between said wrench and the means 13 to create an outward thrust on the wrench, and adjusting means 18 interengaging the wrench and plug to impart said outward thrust to the plug.

The body 10 is open at the top where the same is provided with internal screw threads 19. Therebeneath said body encloses a chamber 20 in which the body 21 of plug 12 resides. A pair of opposed bosses 22 extend from said body and are provided with the usual pipe threads 23 for connection to pipes or conduits.

According to the invention, concentric with each boss 22 and in the wall of chamber 20, the body is formed with a circular seat 24. Each port member 11 comprises an annulus 25 that fits into its respective seat as seen in Figs. 2 and 4. It is contemplated that said members be permanently secured by silver solder or the like. Said members may be readily introduced through the open top of the body 10 and, after assembly, may be machined or ground on their faces 26 to accord with and fit the taper of plug body 21.

While the body 10 is subject to distortion under heat and/or pressure, the above-described opposite ports may move slightly toward or from each other without, however, being influenced by the body distortion. It will be seen, from this construction, that the body may inexpensively be formed or cast of steel while the port members 11 may be made of corrosion-resistant material such as an aluminum-bronze alloy.

The plug body 21 of plug 12 is preferably chrome plated on its conical surface for friction and wear-reducing contact with port faces 26. Said plug body is shown with a transverse passage 27 to connect ports 11 when aligned therewith.

The plug 12 is provided with an integral stem 28 which, adjacent to the body 21, is provided with an annular groove 29 adjacent to said body and defined by a pair of annular flanges 30. The outer end of said stem has a polygonal portion 31 and a tapped seat 32 extends centrally or axially into said outer end of the stem.

The mounting means 13 comprises a cast metal fitting 34 having threads engaged with threads 19 of body 10. The inner end of said fitting is formed to have an annular seat 33 for combination radial and thrust bearing 14, said bearing being confined between a shoulder 35 of the fitting and a shoulder provided by one flange 30. The former shoulder engages the outer race of the bearing while the latter shoulder engages the inner race. It will be noted that seat 33 is enclosed by an annular skirt 36 of the fitting and that the inner face of said skirt and the cylindrical face of plug stem 28 are so spaced as to allow bearing 14 to float laterally therebetween. Thus, the bearing does not center the valve plug which is, thereby, enabled to center itself between port members 11.

The inner end of skirt 36 serves as a locating shoulder for packing ring 15. An O-ring 38 seals between the inner cylindrical face of said packing ring and the stem groove 28, and an O-ring 39 seals between cylindrical wall 40 of chamber 20 and a groove in the outer cylindrical face of said packing ring.

The outer end of fitting 34 is formed to have a polygonal face 41, the same extending outward from body 10. Said outer end of fitting 34 is provided with an annular seat 42 that opens outwardly.

The wrench 16 is formed as a metal casting having a boss 43 provided with a polygonal socket 44 receptive of polygonal stem portion 31, and an offset tubular port 45 into which a bar or length of pipe may be introduced to serve as a lever for effecting rotation of plug 12. The boss 43 is provided with a hole 46 that is in alignment with the tapped seat 32, the adjusting means in the form of a cap screw having a shank 47 extending through said hole into threaded engagement with seat 32. The head 48 of said screw bears on the outer face of boss 43.

As shown, boss 43 is split at 49 and the split portions connected by a clamp screw 50 to enable locking of screw 18 in its adjusted position.

The resilient means 17 is shown as a helical spring in seat 42, the same being confined between the bottom 51 of said seat and face 52 of boss 43 of the wrench.

A locking plate 53 is provided to engage polygonal extension 41 of fitting 34, said plate being fastened by screws 54 to body 10. The edge 55 is designed to engage the flats of extension 41 and a 120° V-notch 56 serves the same function for the diagonal of said extension.

Rotation of plug 12 is limited, in this case, to 90° between stop screws 57 and 58, an extension 59 of the wrench cooperating with said stop screws.

Valve is assembled by first dropping plug 12 into the body with passage 27 aligned with ports 11. Then, packing ring 15 together with O-rings 38 and 39 are slipped into place, as well as bearing 14. Then, fitting 34 is threaded into screw seat 19 until the shoulder 35 thereof firmly engages the outer race of the bearing, thus assuring firm engagement of the inner race with the outer flange 30 of the bearing stem. The plug body 21 should now be quite tightly wedged between faces 26 of port rings 11 because fitting 34 places a downward thrust load on bearing 14 and, through said bearing, on plug body 21. Now, the lock plate 53 is applied to lock either on the flat or the diagonal of extension 41, as the case may be. A slight take-up or back-off of the fitting 34 will allow the above application of plate 53 and yet insure that the plug body 21 will be firmly engaged between port rings 11. Now, spring 17 is dropped into seat 42 and the wrench 16 is slipped on stem end 31. And, finally, adjusting screw 18 is applied to compress said spring, achieve a reactive easing of the plug body 27 and an additional loading of bearing 14 since spring 17, through wrench 16, imparts a resilient upward biasing thrust in plug body 21. The valve plug is thus resiliently urged against moving in a direction toward the closed end of the valve body and said resilient force maintains a constant loading on bearing 14. After screw 18 has been set as desired, clamp screw 50 is tightened to obviate inadvertent loosening thereof.

Because of the above constant loading of bearing 14, the plug body 21 cannot move endwise in either direction. Since the spring 17, as adjusted by screw 18, eases the contact of the plug body with port rings 11, the latter can contract without seizing said plug body and, when again expanded or separated, said plug body cannot follow to be in position to be seized upon subsequent contraction of the port rings.

Removal and replacement of the plug from and into the valve body will not affect the nicety of adjustment above described, since such removal is effected by separation at threads 19 and replacement will always be to the initial alignment of the parts as locked by plate 53.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. In combination, a valve body having flow ports provided with tapered opposed faces, a rotatable tapered plug in said body and provided with a transverse bore and an annular shoulder, a fitting connected to the body and concentric with the plug, a combination radial and thrust bearing interposed between said fitting and annular shoulder on the plug to hold the plug against said tapered faces of the flow ports, a wrench member non-rotationally engaged with the plug for turning the latter, a helical spring interposed between said fitting and wrench member, and an adjustable member connecting the plug and wrench member to simultaneously draw the wrench member in a direction to compress the spring and bias the plug in a direction to load the bearing to, thereby, resiliently urge the plug against movement axially during expansion and contraction of the valve body.

2. In a plug valve having a body subject to expansion and contraction and having port seats for the plug adapted to move relative to the plug during such expansion and contraction of the body, and the plug having a transverse passage and a stem extending outwardly of the body, the improvement that comprises a fitting connected to the body outward of the plug and having a central passage through which the plug stem extends, an annular shoulder on the plug inward of the fitting, an anti-friction bearing between said fitting and shoulder, an enlarged member on the outwardly extending end of the plug stem, the enlarged member having non-rotational and axially adjustable engagement with the plug stem, spring means between said fitting and member, adjusting means interconnecting the plug stem and the enlarged member to adjust the tension of the spring means and the loading of the bearing, the spring means creating a resilient force biasing the plug in an outward direction to, thereby, load the bearing and maintain the axial position of the plug regardless of the mentioned movement of the valve seats when the valve body expands or contracts.

References Cited in the file of this patent

UNITED STATES PATENTS

| | | |
|---|---|---|
| 476,113 | Andre | May 31, 1892 |
| 556,889 | Jennings | Mar. 24, 1896 |
| 826,536 | Butterfield | July 24, 1906 |
| 1,615,934 | Crowe | Feb. 1, 1927 |
| 1,697,608 | Patterson | Jan. 1, 1929 |
| 1,842,211 | Slayton | Jan. 19, 1932 |
| 2,070,899 | Hamer | Feb. 16, 1937 |
| 2,235,307 | Atkinson | Mar. 18, 1941 |
| 2,364,700 | Eplett | Dec. 12, 1944 |

FOREIGN PATENTS

| | | |
|---|---|---|
| 305,941 | Great Britain | Feb. 11, 1929 |